US010862848B2

(12) United States Patent
Palola et al.

(10) Patent No.: US 10,862,848 B2
(45) Date of Patent: Dec. 8, 2020

(54) DIGITAL COMMUNICATION SYSTEM AND METHOD INDICATING PRESSING TIME

(71) Applicant: Feelette Oy, Heinola (FI)

(72) Inventors: Erkko Tuomas Palola, Helsinki (FI); Lari Antti Johannes Kangas, Heinola (FI)

(73) Assignee: Feelette Oy, Heinola (FI)

( * ) Notice: Subject to any disclaimer, the term of this patent is extended or adjusted under 35 U.S.C. 154(b) by 0 days.

(21) Appl. No.: 15/662,845

(22) Filed: Jul. 28, 2017

(65) Prior Publication Data

US 2019/0036865 A1    Jan. 31, 2019

(51) Int. Cl.
| | | |
|---|---|---|
| *H04L 12/58* | (2006.01) | |
| *G06F 3/0488* | (2013.01) | |
| *G06Q 50/00* | (2012.01) | |
| *G06N 20/00* | (2019.01) | |

(52) U.S. Cl.
CPC .......... *H04L 51/32* (2013.01); *G06F 3/04883* (2013.01); *G06N 20/00* (2019.01); *G06Q 50/01* (2013.01)

(58) Field of Classification Search
CPC ....... H04L 51/32; H04L 51/10; H04L 51/046; H04L 51/16; H04L 51/04; H04L 51/36; G06Q 50/01; G06F 3/0488; G06F 3/04883; G06N 99/005; G06N 20/00
USPC ......................................................... 709/206
See application file for complete search history.

(56) References Cited

U.S. PATENT DOCUMENTS

| | | | | |
|---|---|---|---|---|
| 9,740,381 | B1 * | 8/2017 | Chaudhri | ............ G06F 3/04845 |
| 10,318,149 | B2 * | 6/2019 | Sun | ................ G06F 3/0481 |
| 2011/0057903 | A1 * | 3/2011 | Yamano | ............ G06F 3/0237 |
| | | | | 345/174 |
| 2011/0154196 | A1 * | 6/2011 | Icho | ................ G06F 3/0485 |
| | | | | 715/702 |
| 2012/0310522 | A1 * | 12/2012 | Nagata | ............. G01C 21/265 |
| | | | | 701/409 |

(Continued)

FOREIGN PATENT DOCUMENTS

| | | | |
|---|---|---|---|
| CN | 105573624 A | * | 5/2016 |
| CN | 105739780 A | * | 7/2016 |

(Continued)

OTHER PUBLICATIONS

Extended European Search Report prepared by the European Patent Office for EP19153849, dated Jul. 12, 2019, 11 pages.

*Primary Examiner* — Michael C Lai
(74) *Attorney, Agent, or Firm* — Chernoff Vilhauer LLP

(57) ABSTRACT

An object of the invention is a digital communication system including a digital communication device (101) of a first user and a digital communication device (103) of second user. The digital communication device includes a means (100) for forming a message at least on the basis of a pressing time, the message comprising information related to the pressing time. The digital communication system comprises means (102) for transmitting the message from the first digital communication device (101) to the second digital communication device (103) or vice versa, means (105) for receiving the message from the other digital communication device (101, 103), and means (104) for presenting the received message on the basis of the information at least related to the pressing time.

6 Claims, 6 Drawing Sheets

(56) References Cited

U.S. PATENT DOCUMENTS

Figure 1:
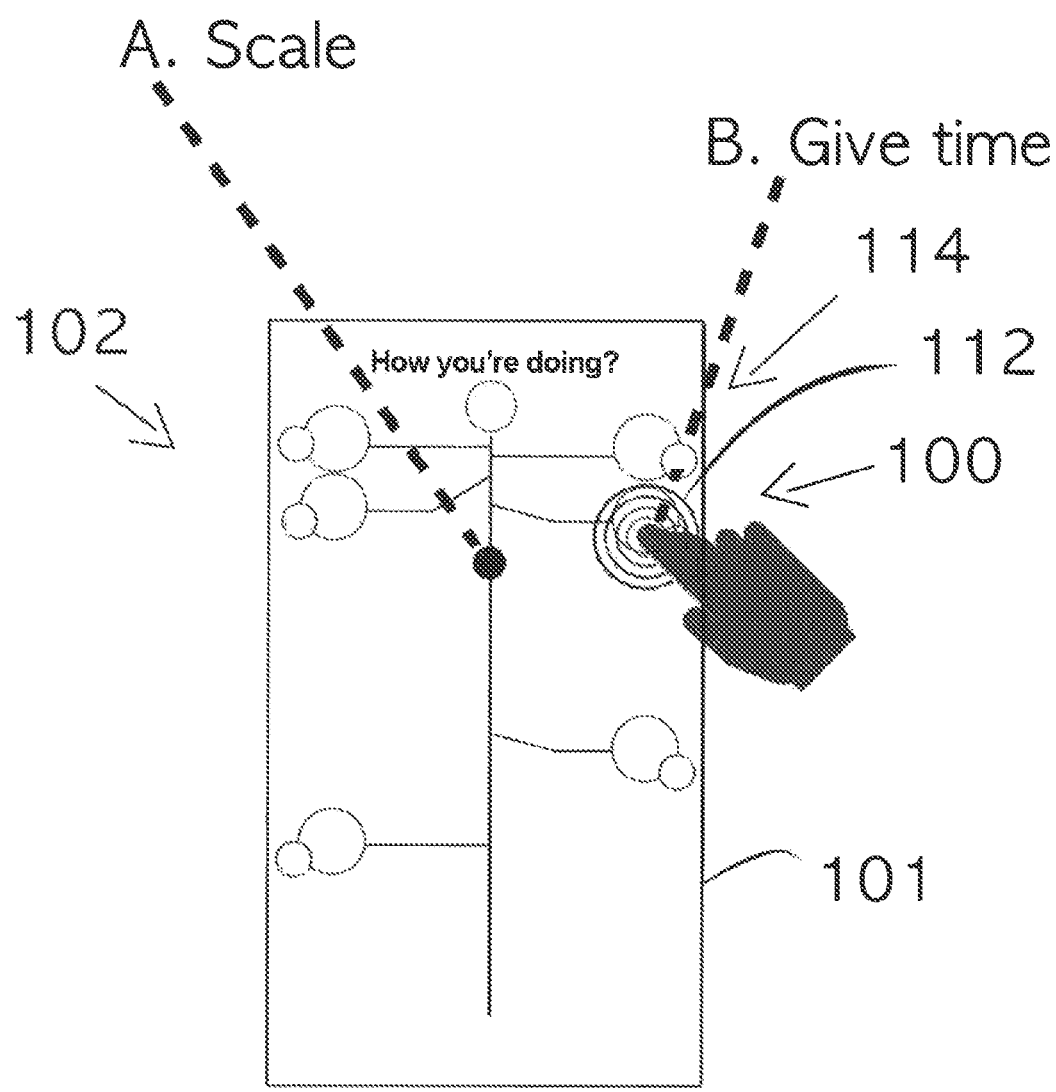

| | | | | |
|---|---|---|---|---|
| 2013/0249919 A1* | 9/2013 | Osada | ................... | G06Q 10/10 |
| | | | | 345/472 |
| 2013/0254720 A1* | 9/2013 | Qi | ...................... | H04M 1/7258 |
| | | | | 715/847 |
| 2015/0268826 A1* | 9/2015 | Langholz | ................ | H04L 51/10 |
| | | | | 715/752 |
| 2017/0315720 A1* | 11/2017 | Sun | ....................... | G06F 3/0481 |

FOREIGN PATENT DOCUMENTS

| | | |
|---|---|---|
| WO | 2018/190809 A1 | 10/2018 |
| WO | WO-2018190809 A1 * 10/2018 ............. G06Q 20/02 |

\* cited by examiner

```
┌─────────────────────────────────────────────────┐
│ Forming a message by pressing on a display      │
│ and by calculating pressing time                │
└─────────────────────────────────────────────────┘
                       ↓
┌─────────────────────────────────────────────────┐
│ Forming a pressing time dependent information   │
│ to the message, and transmitting said message   │
│ from a first digital communication device to    │
│ a second digital communication device           │
└─────────────────────────────────────────────────┘
                       ↓
┌─────────────────────────────────────────────────┐
│ Processing the message by the second digital    │
│ communication device for presenting             │
│ said information of the message on a display.   │
└─────────────────────────────────────────────────┘
```

Fig. 6

DIGITAL COMMUNICATION SYSTEM AND METHOD INDICATING PRESSING TIME

FIELD OF THE INVENTION

The present invention relates generally to digital communication between e.g. human beings or legal entities. For example, the invention relates to mobile device communication via internet.

BACKGROUND OF THE INVENTION

Currently all social media communication includes emoticons as expressions of like, or as in Reddit like or dislike and thumbs up or thumbs down, etc. Facebook has evolved from simple like thumbs up button to love heart, thankful flower, haha face, sad face and angry face, etc. Every other social media has followed. In Twitter, communications have used heart and retweet. Chats have hundreds of emoticons and they've become part of everyday communication in a same way as shortening of words used to be in text (SMS) messages. For example, in a SMS message can be written, this is 4U—for you, or I<3 U—I love you. Symbols like :) smile have been meaningful means of communication of moods—happiness or sadness.

Another evolution of social media has been heightened, even exponential, expressions of like or dislike. This phenomena is most commonly known as social media rage. Negatives are more visible and popular than the positives, both distortions exist. For example, when a user posts an update of an outrage, the purpose of the posts is mostly to seek empathy, from the persons accepted as social media friends. Therefore, it's natural that a social media friend comments empathizing, thus heightening the feeling on the original post. A second friend then picks up where the first two left off, reads the original post and then comments, wants to empathize, and to be noticed, and finds even stronger way to communicate than the first empathizer. This leads the second person to comment even more strongly than the first person. Third comment is heightened even more to be noticed and consequently social media rage phenomena is created. The original post's feeling is exaggerated and social media outrage multiplied. This is an increasing problem in digital communication according to the prior art techniques.

Short Description of the Invention

An object of the invention is a digital communication system and method that is practical and easy to use, and which gives a positive influence to a communication between users e.g. in social media. This is achieved by a digital communication system which comprises a digital communication device of a first user and a digital communication device of second user, and said digital communication device comprises a means for forming a message at least on the basis of a pressing time, said message comprising information related to said pressing time, and the digital communication system comprises means for transmitting said message from the first digital communication device to the second digital communication device or vice versa, a means for receiving said message from the other digital communication device, and a means for presenting said received message on the basis of said information at least related to said pressing time.

The focus of the invention is also a digital communication method in which a message is formed by pressing on a digital communication device at least on the basis of a pressing time, said message comprising information related to said pressing time, and in which the message is transmitted from the first digital communication device to the second digital communication device or vice versa, such that a received message is received from the other digital communication device, and said received message is presented on the basis of information at least related to said pressing time.

Disclosed is a digital communication device which comprises a means for forming a message at least on the basis of a pressing time, and said message comprises information related to the pressing time. The digital communication system comprises means for transmitting said message from the first digital communication device to a second digital communication device, which presents said message on the basis of said information at least related to said pressing time.

A benefit of the invention is that it is easy to use; and gives a more personal communication feeling to the communication between the users thus preventing negative communication effects such as social media outrage from increasing. The invention also enables applications in which learning skills of the artificial intelligence systems and/or robots can be enhanced.

SHORT DESCRIPTION OF THE FIGURES

FIG. 1 presents a first embodiment of the digital communication according to the present invention.

Figure 2:
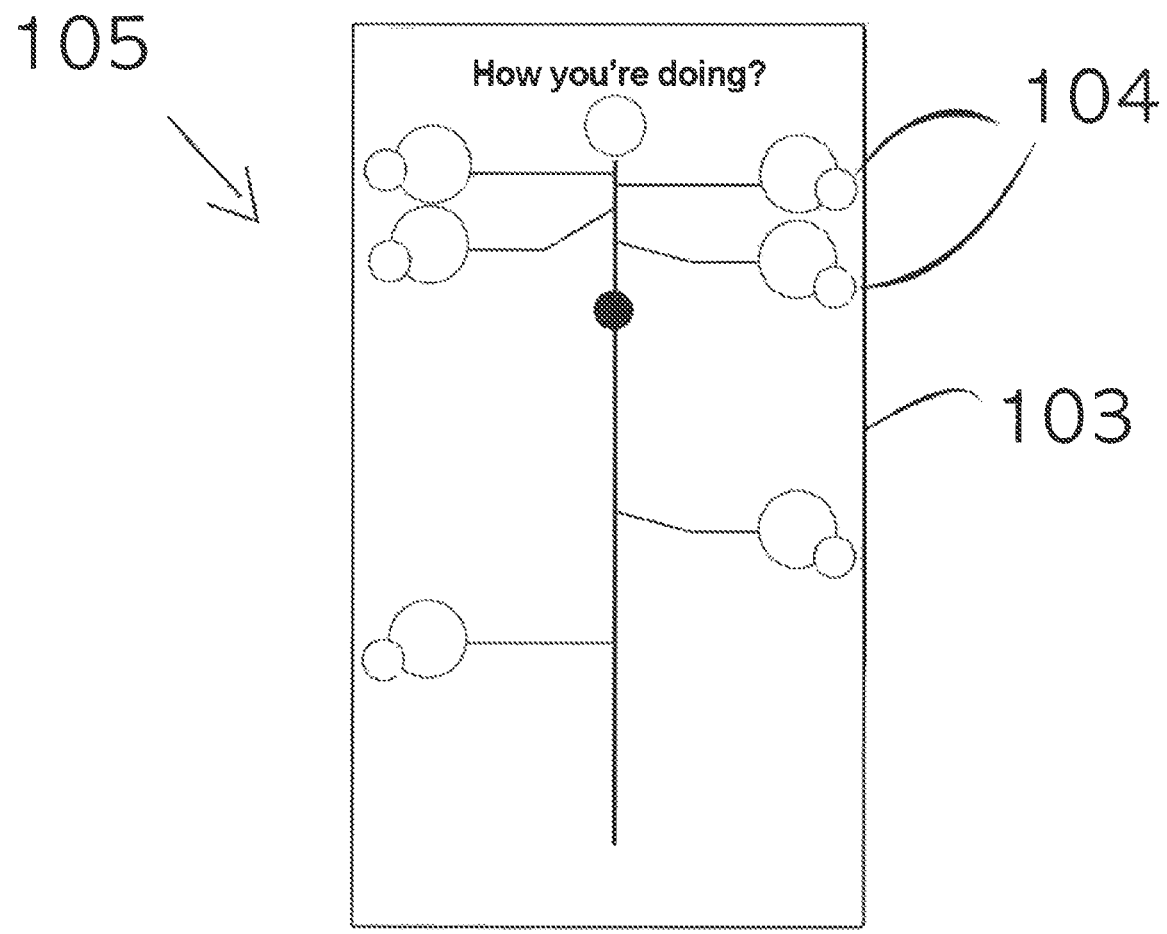

FIG. 2 presents a first embodiment of the digital communication according to the present invention.

Figure 3:
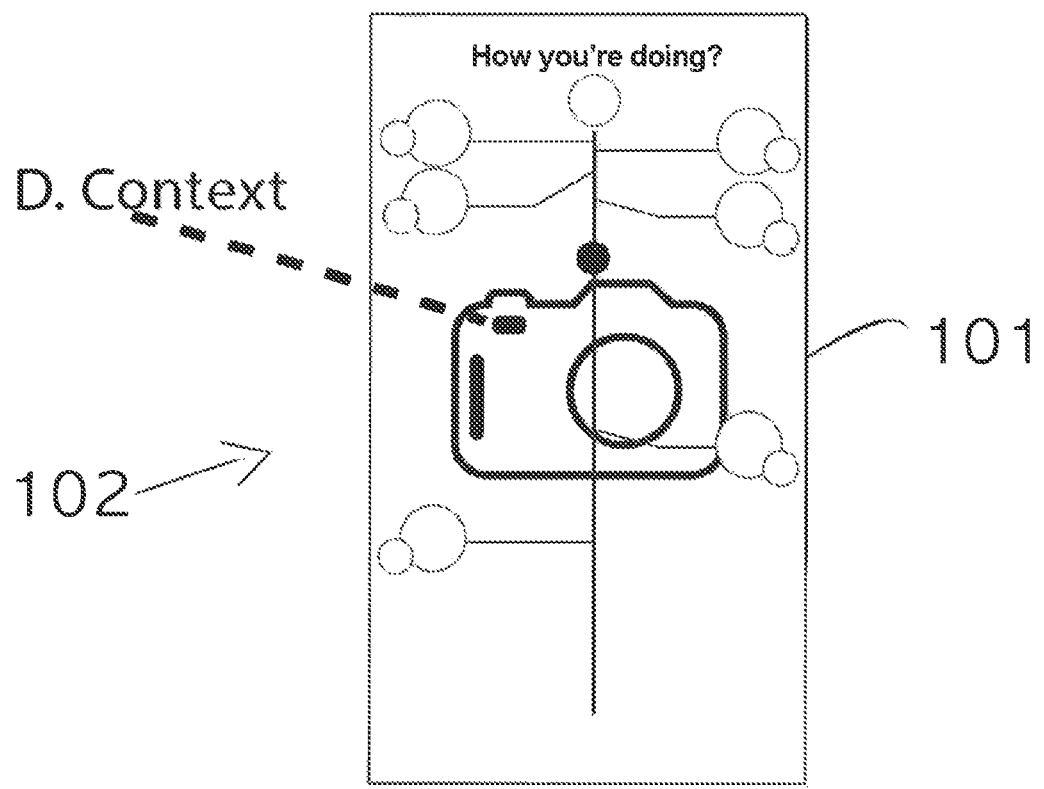

FIG. 3 presents a first embodiment of the digital communication according to the present invention.

Figure 4:
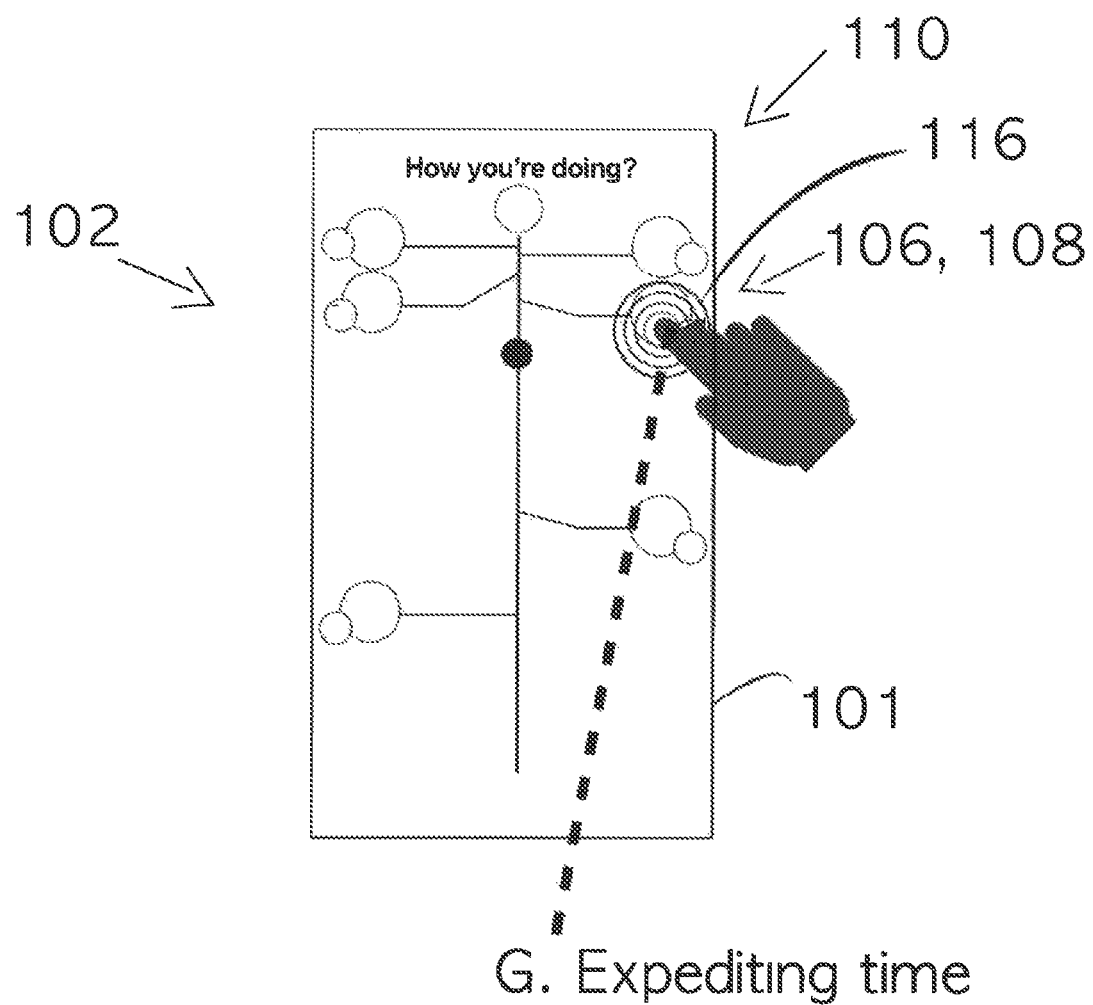

FIG. 4 presents a second embodiment of the digital communication according to the present invention.

Figure 5:
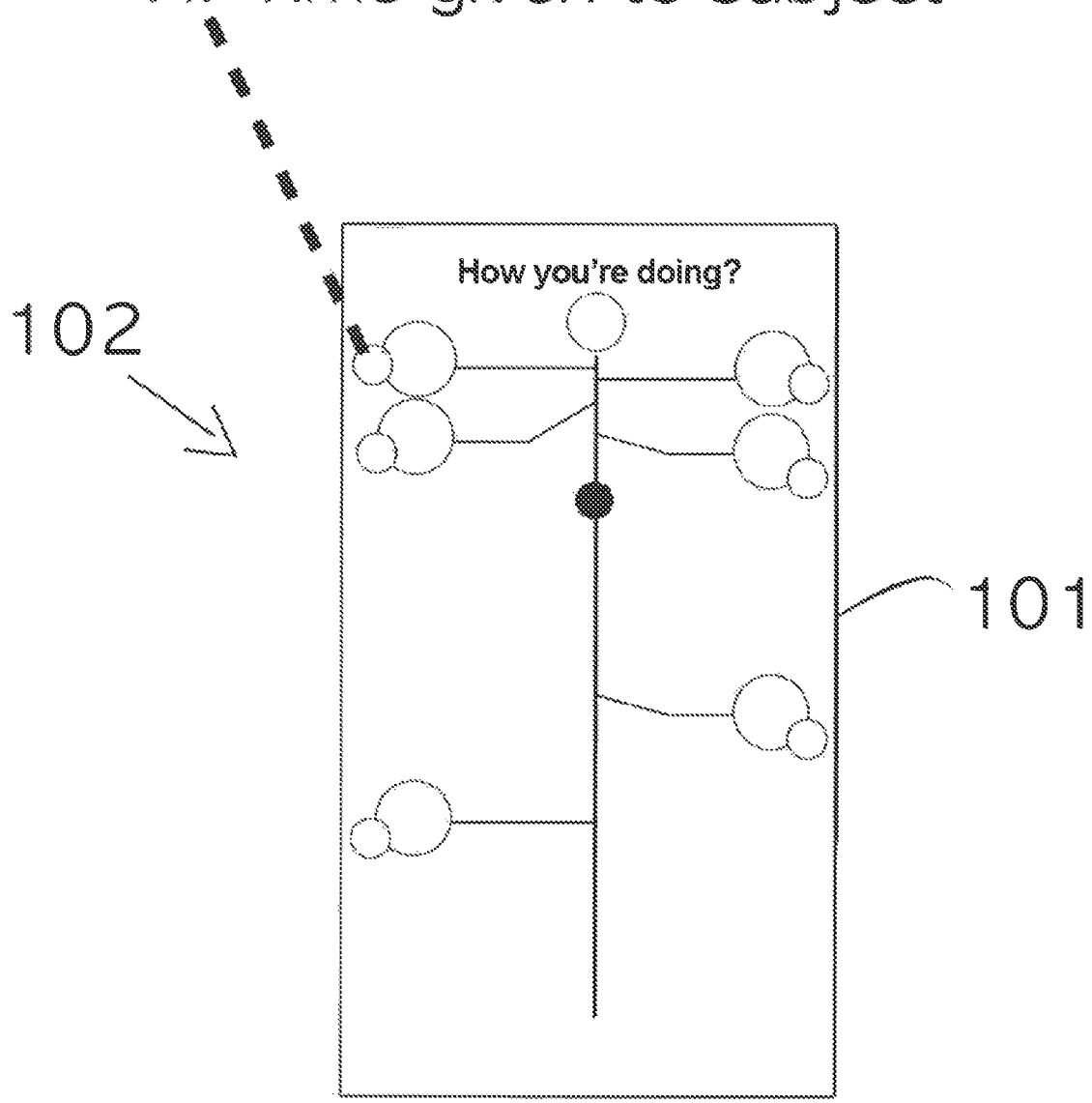

FIG. 5 presents an exemplary embodiment of the digital communication according to the present invention.

FIG. 6 presents a flow chart showing the method of the digital communication herein.

DETAILED DESCRIPTION OF THE INVENTION

According to the present invention, digital communication can be arranged between users creating a means of reaction, which emphasizes with the previous post effectively, therefore disabling growth of social media rage or distortion of users' feelings otherwise. Communication of moods in social media is developed as scaling embodiments instead of prior art emoticons. The invention also enables novel and enhanced communication devices and methods to be utilized commercially e.g. in selling and marketing.

In FIGS. 1-3 is presented a first embodiment according to the present invention, wherein a user can give time to a friend (other user) by using a digital communication device 101, 103 such as e.g. a mobile phone, a tablet, a computer, a television, an elevator, a refrigerator, a car, an augmented reality device, etc. The user can give time e.g. by touching friend's picture on a touch screen 106. The digital communication device 101, 103 comprises means 100 for forming a message at least on the basis of a pressing time. Said formed message comprises information related to said pressing time. The means 100 works by recognizing user's different kinds of touches on the digital communication device, i.e. user's long press has a different meaning as a short press. The means 100 can also recognize where the user presses on the device's screen 112 (touch screen) and connects to various functions according to the pressing location 114. By pressing the friends' thumbnail or icon for example, for the desired time and/or pressure, the means 100 recognizes the action to be done.

The given time can be linked to various messages which have ratings. The ratings have context (D in FIG. 3), to which the time is given. The context can be anything that can be presented with the digital communication device 101, 103, e.g. a photograph, a video, a sound, a text, an emoticon or vibration. The meaning of the given time can therefore be feelings of sympathy or empathy to a post where feelings are low, simple harmony of the original posts feeling, and most importantly, support or sharing of the joy, when the user has shared an elated feeling in their post. Giving time to your social media friend is therefore something very novel and impressing.

In FIG. 4 is presented second embodiment according to the present invention. The digital communication system can comprise means 108 for forming a message at least on the basis of a pressing pressure. The message comprises information related to said pressing pressure. For example, a hard press is differently processed according to the invention than a soft press. Performance of the means 106 and 108 can be combined and they calculate the time pressed and the pressing pressure 116 in order to interpret the feeling the user want to convey to the other user. The time pressed is calculated by the means 106 and 108 in seconds, minutes, hours and days. Even broken seconds can be calculated in $1/1000$ seconds, $1/100$ seconds and $1/10$ seconds. In one embodiment according to the invention, moving the thumb on the touch screen after time-giving has started does not end the process, but only releasing does.

The digital communication system according to the invention can comprise a means 108 for forming a message at least on the basis of a stepwise pressing pressure values. Said message comprises information depending on the different stepwise pressing pressure values. For example, pressing harder exaggerates the emotion communicated to the friend or another subject. Presses can for example be expedited (G in FIG. 4) by the scale of ten; 10%, 20%, 30%, until 100% exaggeration. Hardest press can expedite or multiply the time given e.g. by two times. Softer presses can multiply the time given again by the scale of tenth; by 1,1 or 1,2 or 1,3 or 1,4 until 2,0. According to this example, the hardest press on the screen will exaggerate 30 second press to show 1 minute. Or with 1,5 level press in 30 seconds will increase to 45 seconds time given to the friend who receives the message.

In embodiments according to the invention can also be users other than real persons. As users can be, for example, institutional subjects or artificial intelligence or other internet of things (IoT) or any other account holders in an application. Also, users can be advertisers, promoters, or any other legal entity other than real persons. A message given (H in FIG. 5) can for example be a movie or a game, or sections of a movie or a game, which is promoted by a service provider and users can therefore give it time. Time given can thereafter be interpreted as expressions of love or like or support, or dislike, to the promoted context. Communication can therefore also be to a legal entity such as an artistic copyright: e.g. a painting, an installation or another piece of art.

When time is given, the system sends the communication and another receiver on the system receives it. The user can give it context specific, depending on the rating given, or without a reason. What is transmitted is those seconds or minutes from the pressing the icon to the recipient's specific post or profile. It is left to the users to interpret what the pressing time, or the pressing pressure mean. The program simply calculates and transmits the time and the force of the press, and interprets it as time given.

Consequently, it all becomes a game. The users' interest is peaked by questions, such as whether they have given the user time. Why has this person or entity given me time, and how much? What is the purpose of the hard press and do I understand that press in the context of the original update or not? Is this time too much to give? Are there hidden agendas or is that time giving genuinely celebrating my ups and downs, my feelings, my moods? Time giving according to the invention can lure users to interact in other means of communication on the application, or simply to give time back. It is not only one, but two-way communication between the users.

Empathizing in social media becomes efficient to cut the cycle of social media rage phenome. Time given to a context according to the present invention does not cause the second or third commenters needing to exaggerate in empathizing as stated in the prior art problem. Or should the need arise to empathize more than the first comment, giving time more does not constitute social media rage or instigate it from third parties.

In FIG. 5 is illustrated different amounts of given time allocated to different users. Interpretation aside, what is a fact, is that your user friend, real person person or not, gave you certain number of seconds of his or her time, pressed on the screen with certain force and pointed this action to a specific place on the screen, namely your profile picture? It is like touching a person virtually. The questions follow, are the time given context specific or generally to me? Does he or she or it like me that much, does he sympathize with me or my post, the context, or what is the purpose of that action? These questions can be instigated intentionally and for commercial gain, making also commercials on the platform possible and very effective.

Giving time digitally is a novel form of communication. Context specific or non-context specific communication between entities, including persons, legal entities or e.g. artificial intelligence robots, in mobile devices or in other parts of IoT (Internet of Things) system.

In FIGS. 1-5 are presented preferred embodiments according to the present invention, and they are summarized herein. A digital communication system comprises a digital communication device 101 of a first user and a digital communication device 103 of second user. The user of the digital communication devices 101, 103 can be e.g. a human person, a legal entity, an artificial intelligence system or a device in IoT (Internet of Things) system. The digital communication devices 101,103 can be e.g. a mobile device (a mobile phone, a tablet, a computer, a car, an augmented reality device, etc), and the digital communication system is e.g. an internet program used via internet. The digital communication device comprises means 100 for forming a message at least on the basis of a pressing time. The message comprises information related to said pressing time. The digital communication system can also comprise means 106 for forming a message at least on the basis of a pressing pressure, wherein the message comprises information related to said pressing pressure. Also the digital communication system can comprise means 108 for forming a message at least on the basis of a stepwise pressing pressure values, wherein the message comprises information depending on said different stepwise pressing pressure values. In one preferred embodiment the digital communication system can comprise means 110 for identifying an action to be done on the basis of a pressing time or pressing pressure or stepwise pressing pressure or on the basis of a combination of some of or all of them. The digital communication system comprises means 102 for transmitting said message from the first digital communication device 101 to the second digital communication device 103 or vice versa, and means 105 for receiving said message from the other digital communication device 101, 103. Most often, transmission is performed in a wireless communication, and the means 102, 105 for transmitting and receiving can be any means suitable for performing such functions, e.g. transmission and receiving means used in mobile device communication.

In the preferred embodiments, the communication system comprises means 104 for presenting said received message on the basis of said information related to pressing time, pressing pressure, and/or stepwise pressing pressure. The means 104 are configured for presenting context of said received message to which time is being given to.

The presented means 100, 104, 106, 108, 110 for performing different kind of tasks according to the present invention can be carried out programmatically by utilizing e.g. algorithm techniques and/or programs by means of data processor techniques and data processors such as e.g. computers. Means 100 comprise measuring and calculation means for measuring and calculating time pressed e.g. on the touch screen. Means 104, 106, 108, 110 comprise measuring and calculation means for measuring and calculating time and/or pressure pressed e.g. on the touch screen.

In the following is furthermore described different kind of embodiments according to the presented communication invention: A human being (first user) can communicate with an elevator (second user) e.g. to give feedback to the elevator company. A human being (first user) can communicate with a refrigerator (second user) e.g. so that the refrigerator will learn preferences and behavior of the person in order to send recommendations to the person so that he or she remembers to go shopping, and also a shopping list can be provided to the person by the refrigerator. In this example a new kind of special relationship can be build up between the human being and the refrigerator. This relationship can be linked e.g. to the personal health application, and even a personal trainer or a doctor can be involved with the application, or an artificial intelligence robot, which learns to behave like the personal trainer or the doctor. In the embodiments according to the invention can be brought novel methods to communication between the person or non-person users in order to develop e.g. more practical IoT (Internet of Things) applications. The invention also enables applications in which learning skills of the artificial intelligence systems and/or robots can be developed and enhanced.

Thus, while there have been shown and described and pointed out fundamental novel features of the invention as applied to a preferred embodiment thereof, it will be understood that various omissions and substitutions and changes in the form and details of the invention may be made by those skilled in the art without departing from the spirit of the invention. For example, it is expressly intended that all combinations of those elements which perform substantially the same results are within the scope of the invention. Substitutions of the elements from one described embodiment to another are also fully intended and contemplated.

It is also to be understood that the drawings are not necessarily drawn to scale but they are merely conceptual in nature. It is the intention, therefore, to be limited only as indicated by the scope of the claims appended hereto.

The invention claimed is:

1. A digital communication system comprising a first digital communication device used by a first user, a second digital communication device used by a second user, and a processor, wherein
   (a) said first digital communication device is configured to form a message by pressing on a display and by calculating a time datum based at least in part on at least one of a pressing time upon a portion of a display of the first digital communication device, and by calculating a pressure datum gathered from at least one pressing pressure upon the portion of the display, and referencing a compilation of possible message components based on thresholds of duration of pressing and intensity of pressing; said message including message components reflecting a message duration of pressing in said time datum and a message intensity of pressing in stepwise pressure data, where the message components include an indicia of emotion as duration of pressing and intensity of pressing pass thresholds;
   (b) the first digital communication device comprises a transmitter for transmitting said message from the first digital communication device to the second digital communication device, said second digital communication device comprises a receiver for receiving said message and is configured to use the message to indicate to the second user the message components, pressure datum, and the time datum expressed in units of time; and
   (c) the processor and the display present the message in a manner which varies based on at least one of the time datum and the pressure datum.

2. A digital communication system according to claim 1, characterized, in that the digital communication system further comprises a pressing unit to gather pressing pressure information.

3. A digital communication system according to claim 1, characterized, in that the digital communication system further comprises that the first or second user is at least one of a set consisting of a human person, a legal entity, and an artificial intelligence system.

4. A digital communication system according to claim 1, characterized, in that the digital communication system further comprises a calculator capable of identifying message components to be part of the message based on duration of pressing and intensity of pressing.

5. A digital communication system according to claim 1, characterized, in that the first or the second digital communication device is at least one of the set consisting of a mobile phone, a tablet, a computer, a television, an elevator, a refrigerator, a car, and an augmented reality device.

6. A digital communication system according to claim 1, characterized, in that the digital communication system is an internet program.

* * * * *